United States Patent [19]

Wren

[11] 3,731,938

[45] May 8, 1973

[54] RECORD PLAYERS

[75] Inventor: John Pelham Wren, Chiseldon, England

[73] Assignee: Plessey Handel Und Investments A.G., Zug, Switzerland

[22] Filed: May 26, 1971

[21] Appl. No.: 147,006

[30] Foreign Application Priority Data

June 2, 1970 Great Britain....................26,590/70

[52] U.S. Cl. ................................................274/23 R
[51] Int. Cl. ...............................................G11b 3/10
[58] Field of Search ....................................274/23 R

[56] References Cited

UNITED STATES PATENTS 3,292,935 12/1966 Cooper..............................274/23 R

FOREIGN PATENTS OR APPLICATIONS 1,145,865 3/1969 Great Britain......................274/23 R

*Primary Examiner*—Harry N. Haroian
*Attorney*—Blum, Moscovitz, Friedman, Blum & Kaplan

[57] ABSTRACT

A pick-up arm arrangement in which for the reduction of side thrust due to "tracking error" a disc magnet (ferrite) is mounted on the pick-up arm with the axis of the magnet lying along the vertical pivotal axis of the arm while another disc magnet is mounted on a fixed part of the pick-up mounting arrangement and spaced from the magnet along the axis so that in response to pivotal movement of the pick-up about its vertical pivot during the playing of a record the magnetic interaction between the poles of the magnets produced a magnetic force on the arm which opposes the side thrust on the arm. A magnetic shield may be interposed between the magnets in order to afford control of the magnetic force acting on the arm.

3 Claims, 4 Drawing Figures

RECORD PLAYERS

This invention relates to record players and more specifically to the pick-up arm arrangements of such players.

The invention is directed to the reduction of the side thrust exerted on the stylus of the pick-up arm during playing of a disc record due to so-called "tracking error."

According to one aspect of the present invention there is provided a pick-up arm arrangement in which for the reduction of side thrust due to "tracking error" one of a pair of co-axially arranged annular or disc magnets is mounted on the pick-up arm with the axis of the magnet lying along the vertical pivotal axis of the pick-up arm while the other magnet is mounted on a fixed part of the pick-up mounting arrangement and spaced from the first mentioned magnet along said axis so that in response to pivotal movement of the pick-up about its vertical pivot during the playing of a record the magnetic interaction between the poles of the annular or disc magnets produces a magnetic force on the arm which opposes the aforesaid side thrust on the arm.

In carrying out the present invention the magnets are preferably ferrite magnets which are magnetized between the opposed faces thereof and then provided with magnetic keepers so that the magnets each present opposite poles at diametrically opposite positions thereof.

According to another feature of the present invention there is provided a pick-up arm arrangement, such as the arrangement set forth in the two preceding paragraphs or otherwise having co-operating magnets for producing a magnetic thrust on the arm in opposition to the side thrust exerted on the arm due to "tracking error," in which a magnetic shield is arranged to be interposed between the magnets in order to afford control of the magnetic force acting on the arm. The shield is preferably adjustable to a number of different discrete positions according to requirements and the shield may be shaped to provide linear adjustment of the magnetic force exerted on the arm.

The magnetic shield may be constructed so that in one position thereof, hereinafter referred to as the zero position, one of the annular or disc magnets in the arrangement set forth above is almost enclosed by the magnetic shield to cover leakage paths from the sides of the magnet.

Figure 1:
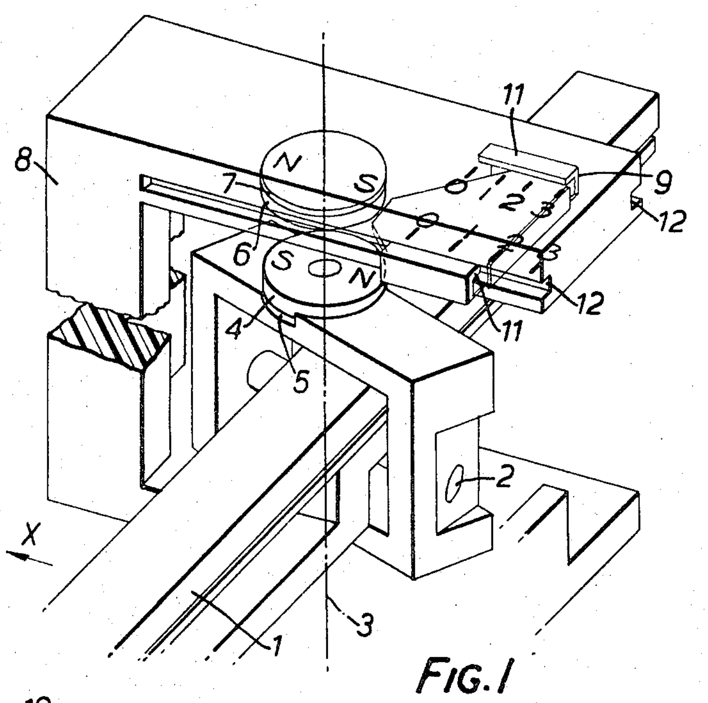
Figure 2:
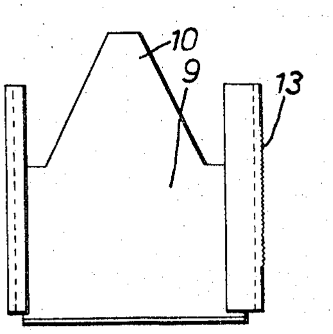
Figure 3:
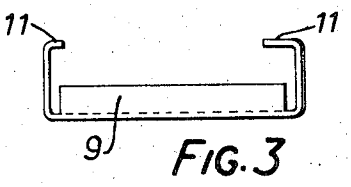
Figure 4:
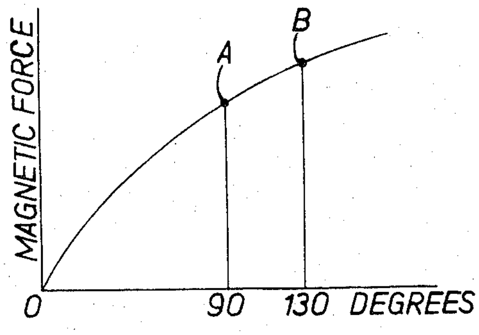

By way of example the present invention will now be described with reference to the accompanying drawings in which:

FIG. 1 is a fragmentary perspective view of a record player pick-up arm arrangement according to the present invention, FIGS. 2 and 3 show underneath and end views respectively of the magnetic shield used in the arrangement of FIG. 1, and FIG. 4 shows a graph of magnetic force on the pick-up arm plotted against the relative angular positions of the magnets of the arrangement of FIG. 1.

Referring to FIGS. 1 to 3 of the drawings the pick-up arm arrangement illustrated comprises a pick-up arm 1 which is pivoted on pivot pin 2 for movement about a horizontal axis and is also pivoted on a vertical pivot pin (not shown) for movement about a vertical axis 3.

When the stylus (not shown) of the pick-up arm engages the groove of a record being played "tracking error" causes the stylus and thus the pick-up arm to have a side thrust exerted on it along a line passing through the stylus and the center of the record spindle and acting towards the center of the spindle and tending to produce movement of the arm 1 in the clockwise direction about the vertical axis 3 as viewed in FIG. 1.

In order to counteract this force the pick-up arm 1 has a magnetic biasing arrangement associated with it. This arrangement comprises a first ferrite (e.g. barium ferrite) magnet 4 of annular form secured to the arm so that the axis of the magnet is coincident with the vertical axis 3 of the arm. The magnet 4 is magnetized between its two radial faces and is provided with a magnetic keeper 5 in the form of a ferro-magnetic disc so that the magnet affords north and south poles at diametrically opposite positions thereof. These poles are presented on the magnet face facing upwards in FIG. 1. This magnet 4 co-operates with another annular ferrite (e.g. barium ferrite) magnet 6 similarly magnetized and having a keeper 7 which is fixedly secured to bracket 8 so that it is co-axially disposed with respect to the magnet 4 and has its lower face presenting opposite poles to the opposing upper face of the magnet 4. The magnetic interaction between the poles of the superposed spaced apart magnets 4 and 6 produces a deflecting force on the pick-up arm when the stylus is positioned on the record and this force opposes the side thrust due to tracking error.

In order to control the magnetic force exerted on the arm a slidably mounted magnetic shield 9 of ferromagnetic material is secured to the bracket 8 and the configuration of the shield is shown clearly in FIGS. 2 and 3. The shield 9 is so shaped at 10 as to produce a substantially linear increasing magnetic force on the arm as the stylus of the pick-up arm moves towards the center of the record during playing. The magnetic shield 9 has inturned flanges 11 which engage grooves 12 in the top limb of the bracket 8 to facilitate sliding movement of the shield and to assist sliding adjustment the magnetic shield is provided along one edge with serrations 13. The bracket 8 is of transparent material in the present embodiment and has two scales appertaining to conical and elliptical stylii respectively for positioning of the magnetic shield 9 with respect to the two magnets.

It may be arranged for example that when the pick-up arm 1 is at its maximum outermost position away from the center of a record the poles of the respective magnets 4 and 6 are at 90° to one another. Inward movement of the arm in direction X in FIG. 1 when tracking a record increases this angle by 40°. Therefore the operating angular movement of one magnet with respect to the other is from 90° to 130°.

A graph of the magnetic force on the pick-up arm 1 against relative angular positioning of the magnets is shown in FIG. 4. From this graph it will be seen that the line from point A to point B is approximately a straight line and therefore the outward bias on the pick-up arm 1 to overcome the side thrust due to "tracking error" will be almost constant over the recorded grooves.

The end 10 of the shield which slides between the opposing faces of the two magnets 4 and 6 is specially shaped to produce a linear scale for adjustment of the magnetic force in order to equate with the stylus forces in increments of 1 gram. A maximum bias force on the pick-up arm 1 will be obtained when the shield is moved away from and outside the magnetic flux path. The bias force is substantially zero at the zero position indicated on the linear scale of the shield 9 when the latter is moved inwards and is completely interposed between the faces of both magnets 4 and 6 and also covers three sides of the magnet 6.

What I claim is:

1. A record player pick-up arm arrangement including a pick-up arm, a mounting arrangement for said pick-up arm including a fixed member thereof, a pair of magnets, said first magnet being mounted on said pick-up arm and said second magnet being mounted on said fixed member of said mounting arrangement and spaced from said first magnet, said magnets having magnetic poles located thereon which interact to produce an angular force on said pick-up arm about a vertical pivotal axis thereof and a movable magnetic shield and mounting means therefor for moving said shield between said magnets to control the magnetic force exerted on said pick-up arm.

2. A record player pickup arm arrangement including a pick-up arm, a mounting arrangement for said pick-up arm, including a fixed member thereof, a pair of coaxially arranged circular magnets, said first magnet being mounted on said pick-up arm with the axis of said first magnet lying along a vertical pivotal axis of said pick-up arm and said second magnet being mounted on said fixed member of said mounting arrangement and spaced from said first magnet along said axis, said magnets having magnetic poles located thereon for interacting to produce an angular force on said pick-up arm about said vertical pivotal axis, and a movable magnetic shield and mounting means therefor for moving said shield between said magnets to control the magnetic force on said pick-up arm.

3. A record player pick-up arm arrangement including a pick-up arm, a mounting arrangement for said pick-up arm including a fixed member thereof, two substantially identical circular magnets, said first magnet being mounted on said pick-up arm with the axis of said first magnet lying along a vertical pivotal axis of said pick-up arm and said second magnet being mounted on said fixed member of said mounting arrangement and spaced from said first magnet along said axis, said magnets having magnetic poles located thereon for interacting to produce an angular force on said pick-up arm about its vertical pivotal axis, and means for controlling said angular force.

* * * * *